United States Patent [19]

Goel et al.

[11] Patent Number: 4,594,397

[45] Date of Patent: Jun. 10, 1986

[54] BICYCLIC AMIDE ACETAL/POLYISOCYANATE/VINYL MONOMER DERIVED POLYMERS

[75] Inventors: Anil B. Goel, Worthington; Timothy A. Tufts, Columbus; Peggy A. Blackburn, Plain City, all of Ohio

[73] Assignee: Ashland Oil, Inc., Ashland, Ky.

[21] Appl. No.: 702,707

[22] Filed: Feb. 19, 1985

[51] Int. Cl.[4] ............................................. C08L 63/00
[52] U.S. Cl. .................................... 525/528; 525/454; 525/903; 528/60; 528/65; 528/66; 528/73; 528/75; 528/85

[58] Field of Search ...................... 528/73, 75, 60, 65, 528/66, 85; 525/454, 528, 903

[56] References Cited

U.S. PATENT DOCUMENTS 4,540,767 9/1985 Goel et al. ....................... 528/73 X Primary Examiner—Theodore E. Pertilla
Attorney, Agent, or Firm—John F. Jones

[57] ABSTRACT

A process for preparing novel polymers having interpenetrating networks comprising polymerizing simultaneously a mixture of a bicyclic amide acetal, a polyisocyanate and a vinyl monomer component is described.

15 Claims, No Drawings

BICYCLIC AMIDE ACETAL/POLYISOCYANATE/VINYL MONOMER DERIVED POLYMERS

This invention relates to a process for the simultaneous polymerization of a monomer mixture comprising a bicyclic amide acetal., a polyisocyanate and a vinyl monomer component and to the novel polymers resulting therefrom.

Bicyclic amide acetals are relatively new materials. The preparation of some of the bicyclic amide acetals is more fully disclosed in the copending U.S. patent applications of Anil B. Goel and of Anil B. Goel and Harvey J. Richards, respectively, filed as Ser. Nos. 641,238 and 641,242 on August 16, 1984.

When two or more polymers are obtained via independent polymerization either sequentially or simultaneously, and the polymers are not connected to each other but instead form a polymeric catena, these materials have been called interpenetrating networks (IPN) in J. Chem. Soc., 1311, (1960). Our invention involves the first time use of bicyclic amide acetals in polymerization to produce IPN polymers.

We have found that the bicyclic amide acetals are compatible with virtually all known vinyl monomers and that such mixtures can be polymerized independently along with polyisocyanates simultaneously by both free radical and addition types of polymerization to produce novel polymers having interpenetrating networks and good physical properties. Thus, when a solution of bicyclic amide acetal and a vinyl monomer component is allowed to react with a polyisocyanate component at a temperature in the range of from about 25 to 200 degrees C. independent polymerization occurs to give polymers having IPN character. In this process the equivalent ratio of bicyclic amide acetal to polyisocyanate component can vary from about 1:0.8 to 1:3 or higher. The reactive functionality of the bicyclic amide acetal toward isocyanate is at least 2. The amount of vinyl monomer component which can be used in the polymerization mixtures of this invention can vary from about 1% to about 99% by weight based on the other components of the mixture.

In order to polymerize the vinyl monomer component it is usually desirable to employ a small amount of a free radical polymerization initiator such as benzoyl peroxide, tertiary butyl peroctanoate, cumene hydroperoxide, azobisisobutyronitrile, etc., as is well known to those skilled in the art of vinyl polymerization. The amount of a free radical polymerization initiator can be varied from about 0.1% to about 5% by weight based on the weight of the vinyl monomer component present in the polymerization mixture.

Bicyclic amide acetals which are useful in this invention include those conforming to the Formula I:

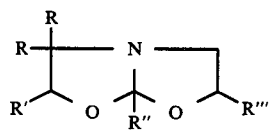

I

Wherein R, R' and R''', independently represent hydrogen or an alkyl group having from 1 to 18 carbon atoms, R''' also can represent an alkyl ether, aryl ether or alkaryl ether group of 1 to 18 carbon atoms, and R'' represents an alkyl group having from 1 to 18 carbon atoms, an aryl group having from 6 to 12 carbon atoms, or an alkaryl group having from 7 to 20 carbon atoms.

The polyisocyanates useful in this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,3-diisocyanate, 1,4-diisocyanato cyclohexane, cyclopentene-1,3-diisocyanate, p-phenylene diisocyanate, 1-methyl phenylene-2,4-diisocyanate, naphthalene-1,4-diisocyanate, toluene diisocyanate, diphenyl-4,4'-diisocyanate, benzene-1,2,4-triisocyanate, xylene-1,4-diisocyanate, xylyene-1,3-diisocyanate, 4,4'-diphenylene methane diisocyanate, 4,4'-dilphenylene propane diisocyanate, 1,2,3,4-tetraisocyanato butane, butane-1,2,3-triisocyanate, polymethylene polyphenyl isocyanate, and other polyisocyanates having an isocyanate functionality of at least two which are more fully disclosed in U.S. Pat. Nos. 3,350,362 and 3,382,215. Polyisocyanates which are polymeric in nature including isocyanate prepolymers of all types are included in this invention.

The vinyl monomer component which is useful in the present invention can include one or more of the well known vinyl monomers such as the conjugated diene monomers, the olefinically unsaturated nitriles, the esters of olefinically unsaturated carboxylic acids, the amides of unsaturated acids, the alpha olefins, the vinyl ethers, the vinyl esters, vinyl aromatic monomers, olefinically unsaturated mono and polycarboxylic acids and their anhydrides, and the like.

Specific olefinically unsaturated nitriles include acrylonitrile, alpha-chloroacrylonitrile, alpha-fluoroacrylonitrile, methacrylonitrile, ethacrylonitrile, maleic dinitrile, fumaric dinitrile, and the like.

Specific esters of olefinically unsaturated carboxylic acids include methyl acrylate, ethyl acrylate, the propyl acrylates, the butyl acrylates, the amyl acrylates, the hexyl acrylates, the octyl acrylates, diethyl maleate, dibutyl fumarate, methyl alpha-chloroacrylate, ethyl alpha-chloroacrylate, methyl methacrylate, butyl methacrylate, dodecyl methacrylate, phenyl methacrylate, and the like.

Specific alpha-olefins include isobutylene, 2-methyl butene-1, 2-methyl-pentene-1, 2-methyl hexene-1, 2-methyl heptene-1, 2-methyl octene-1, 2-ethyl butene-1, and the like.

The vinyl ethers include methyl vinyl ether, ethyl vinyl ether, the propyl vinyl ethers, the butyl vinyl ethers, methyl isopropenyl ether, ethyl isopropenyl ether and the like.

The vinyl esters include vinyl acetate, vinyl propionate, the vinyl butyrates, and the like.

The vinyl aromatic monomers include styrene, alpha-methyl styrene, the vinyl toluenes, the vinyl xylenes, and the like.

The vinyl monomer component can include di-or polyunsaturated vinyl monomers such as hexanediol diacrylate or hexane triol triacrylate, and the like. Polyvinyl monomers usually cause crosslinking of the final IPN polymer and the degree of crosslinking will depend upon the type and amount of polyvinyl monomer used.

Optionally, the polymerizable mixtures of this invention may contain a polyol or a polepoxide or both.

The polyols which can be included in the polymerizable mixtures of this invention include those having at least two hydroxyl groups per molecule and having equivalent weights falling in the range of from 20 to 5000. Specific polyols include butane diol, cyclohexane dimethanol, tripropylene glycol, amide diols

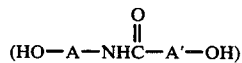

wherein A and A' are alkyl or aryl groups with 2 to 20 carbon atoms, urethane diols

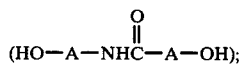

wherein A and A' have the earlier-described definitions, polyether polyols such as poly(tetramethylene ether) diols, poly(propylene ether) polyols, polyester polyols, and the like.

Polyhydroxy polyethers are suitable and preferably those having at least 2 hydroxyl groups per molecule. Polyhydroxy polyethers can be prepared by polymerization of epoxides such as ethylene oxide, propylene oxide, butylene oxide, tetrahydrofuran, styrene oxide, or epichlorohydrin either on their own or by chemical addition to other materials. Suitable other materials include ethylene glycol, propylene glycol, trimethylol propanes and 4,4'-dihydroxy diphenyl propane. Sucrose polyethers also may be used. Polybutadienes having hydroxyl groups as well as other known hydroxyl containing vinyl addition polymerized polymers can be used. Hydroxyl containing polyesters, polythioethers, polyacetals, polycarbonates or polyesteramides of the types known for the formation of polyurethanes may also be used.

Polyepoxides which can be used optionally in this invention can be monomeric or polymeric, saturated or unsaturated, aliphatic, cycloaliphatic, aromatic or heterocyclic, and they may be substituted if desired with other substituents besides the epoxy groups, e.g., hydroxyl groups, ether radicals, halogen atoms, and the like. Typical epoxy components suitable in the practice of this invention include those disclosed in U.S. Pat. Nos. 2,500,000 and 2,324,483 which are incorporated here by reference. Preferred in this invention are 1,2-epoxy compounds having an epoxide equivalence greater than 1, that is to say, compounds containing more than one group of the formula

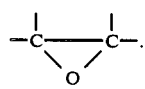

The 1,2-epoxide groups may be either terminal or inner ones. Particularly suitable terminal 1,2-epoxide groups are 1,2-epoxy ethyl or 1,2-epoxy propyl groups. The latter may be linked to an oxygen atom, that is to say they are glycidyl ether or glycidyl ester groups. Compounds with inner epoxide groups usually contain the 1,2-epoxide group in an aliphatic chain or in a As epoxy compounds containing an inner 1,2-epoxy group there are suitable epoxidized diolefins, dienes, or cyclic dienes, such as 1,2,5,6-diepoxy hexane, 1,2,4,5-diepoxycyclohexane, dicyclopentadiene diepoxide, dipentene diepoxide, and more especially vinyl cyclohexene diepoxide; epoxidiz diolefinically unsaturated carboxylic acid esters, such as methyl-9,10,12,13-diepoxystearate, or the dimethyl ester of 6,7,10,11-diepoxy-hexadecane-1,16-dicarboxylic acid. Furthermore, there may be mentioned epoxidized mono-, di-, or polyesters, mono-, di- or polyacetals containing at least one cycloaliphatic 5-membered or 6-membered ring, to which at least two 1,2-epoxide groups are linked.

A widely used class of epoxides which may be used in the present invention are the epoxy polyethers obtained by reacting a halogen containing epoxide or dihalohydrin, such as epichlorohydrin, epibromohydrin, 3-chloro-1,2-epoxyoctane, and the like with either a polyhydric phenol or a polyhydric alcohol.

The IPN polymers produced in this invention generally have decidedly better impact resistance than blends of polymers produced from the individual condensation and free radical polymerization systems. The IPN polymers and process of this invention are useful in reaction injection molding systems, adhesives, coatings and other polymer applications.

The process of this invention is further illustrated in the following representative examples.

EXAMPLE 1

A solution of a bicyclic amide acetal of Formula I in which R, R' and R''' are hydrogen and R'' is methyl (48 g) and 40 g of methyl methacrylate was degassed at room temperature and at reduced pressure and then mixed with 113 g of degassed, liquified 4,4'-methylene bis(phenyl isocyanate) containing 0.4 g of benzoyl peroxide. The resulting polymerization mixture was poured into a parallel glass plate mold in which the glass plates were separated by ⅛ inch spacers. The mold was then heated at 100° C. for an hour followed by heating at 130° C. for two hours. The white, opaque polymer sheet which resulted was found to have an ASTM D648 heat distortion temperature of 103° C. and an ASTM D256 notched izod impack strength of 1.23 foot pounds per inch of notch.

EXAMPLE 2

This example is outside the scope of this invention. The procedure of Example 1 was followed except that no methyl methacrylate was included in the polymerization mixture. The polymer sheet which was obtained was found to have a heat disortion temperature (HDT) of 149° C. and a notched izod impact strength (NII) of about 0.5 foot pounds per inch of notch.

EXAMPLE 3

The procedure of Example 1 was followed except that 0.2 g of t-butyl peroctoate was used in place of the benzoyl peroxide. The final sheet was found to have a HDT of 126° C. and a NII of 0.94 foot pounds/inch of notch.

EXAMPLE 4

The procedure of Example 1 was followed except that 0.2 g of cumene hydroperoxide was used in place of the benzoyl peroxide. The final polymer sheet was found to have a HDT of 134° C. and a notched izod impact strength of 0.42 foot pounds per inch of notch.

EXAMPLE 5

The procedure of Example 1 was repeated except that 5 g of hexane diol diacrylate was included in the solution of bicyclic amide acetal and methyl methacrylate. The final IPN polymer sheet was found to have a HDT of 88° C. and a notched izod impact strength of 1.1 foot pounds/inch of notch.

EXAMPLE 6

The procedure of Example 1 was repeated using 40 g of styrene instead of the methyl methacrylate. The final IPN polymer sheet was found to have a HDT of 94° C. and a NII of 0.9 foot pounds/inch of notch.

EXAMPLE 7

The procedure of Example 1 was repeated using 80 g of styrene in place of the methyl methacrylate and 0.8 g of the benzoyl peroxide. The final IPN polymer sheet was found to have a heat distortion temperature of 87° C. and a NII of 0.51 foot pounds/inch of notch.

EXAMPLE 8

The procedure of Example 6 was repeated using 5 g of hexane diol diacrylate in the bicyclic amide acetal/styrene solution. The final IPN polymer sheet was found to have a HDT of 95° C. and a NII of 0.9 foot pounds/inch of notch.

EXAMPLE 9

The procedure of Example 1 was repeated except that 24 g of the bicyclic amide acetal and 59 g of the diisocyanate were used. The final IPN polymer sheet was found to have a HDT of 95° C. and a NII of 0.9 foot pounds/inch of notch.

EXAMPLE 10

The procedure of Example 1 was followed using 33 g of the bicyclic amide acetal, 87 g of the diisocyanate, 36 g of butyl acrylate, 0.3 g of cumene hydroperoxide and 22 g of dimerized linoleic acid capped with ethylene oxide to form a diol was also included. The final IPN polymer sheet was found to have a heat distortion temperature of 155° C. and a notched izod impact strength of 0.9 foot pounds per inch of notch.

EXAMPLE 11

The procedure of Example 5 was followed using 33 g of bicyclic amide acetal, 92 g of the diisocyanate, 5 g of hexane diol diacrylate 0.4 g of benzoyl peroxide and also included was 22 g of the diglycidyl ester of linoleic acid dimer. The final IPN polymer sheet was found to have a heat distortion temperature of 105° C. and a notched izod impact strength of 0.3 foot pounds per inch of notch.

We claim:

1. The process comprising simultaneously polymerizing a mixture of a bicyclic amide acetal, a polyisocyanate and avinyl monomer component carried out at a temperature in the range of from about 25° C. to about 200° C. wherein the equivalent ratio of bicyclic amide acetal to polyisocyanate is in the range of from about 1:0.8 to 1:3 and the vinyl monomer component varies from 1% to 99% by weight based on the other components in the mixture.

2. The process of claim 1 wherein there is also included in the mixture frojm 0.1 to 5% by weight of the vinyl monomer component of a free radical polymerization initiator.

3. The process of claim 2 wherein the bicyclic amide acetal is one conforming to the Formula

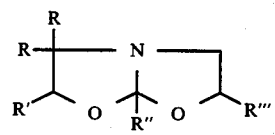

wherein R, R' and R'" independently represent hydrogen or an alkyl group having from 1 to 18 carbon atoms, R'" can also represent an alkyl ether, aryl ether or alkaryl ether group having from 1 to 18 carbon atoms, and R" represents an alkyl group having from 1 to 18 carbon atoms, an aryl group having from 6 to 12 carbon atoms, or an alkaryl group having from 7 to 20 carbon atoms.

4. The process of claim 3 wherein the vinyl component is composed of esters of olefinically unsaturated carboxylic acids or vinyl aromatic monomers.

5. The process of claim 4 wherein the polyisocyanate is a diisocyanate.

6. The process of claim 5 wherein the bicyclic amide acetal is one in which R, R' and R'" are hydrogen and R" is methyl.

7. The process of claim 6 wherein the diisocyanate is 4,4'-methylene bis(phenyl isocyanate).

8. The process of claim 7 wherein the vinyl monomer component is methyl methacrylate.

9. The process of claim 7 wherein the vinyl monomer component is methyl methacrylate and hexane diol diacrylate.

10. The process of claim 7 wherein the vinyl monomer component is styrene.

11. The process of claim 7 wherein the vinyl monomer component is styrene and hexane diol diacrylate.

12. The process of claim 1 wherein there is included in the mixture of polyol.

13. The process of claim 1 wherein there is included in the mixture a polyepoxide is a compound containing more than one group of the Formula

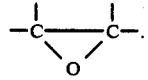

14. The polymer produced by the process of claim 1.

15. The polymer produced by the process of claim